(12) United States Patent
Gedin et al.

(10) Patent No.: US 10,458,279 B2
(45) Date of Patent: Oct. 29, 2019

(54) OIL SUPPLY DEVICE FOR AN EPICYCLIC REDUCTION GEAR SET

(71) Applicant: SAFRAN TRANSMISSION SYSTEMS, Colombes (FR)

(72) Inventors: Patrice Gedin, Moissy-Cramayel (FR); Benjamin Feraud, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 50 days.

(21) Appl. No.: 15/759,472

(22) PCT Filed: Sep. 8, 2016

(86) PCT No.: PCT/FR2016/052238
§ 371 (c)(1),
(2) Date: Mar. 12, 2018

(87) PCT Pub. No.: WO2017/046481
PCT Pub. Date: Mar. 23, 2017

(65) Prior Publication Data
US 2018/0258794 A1    Sep. 13, 2018

(30) Foreign Application Priority Data

Sep. 15, 2015  (FR) ...................... 15 58616

(51) Int. Cl.
*F01D 25/18*         (2006.01)
*F02K 3/04*          (2006.01)
(Continued)

(52) U.S. Cl.
CPC ............... *F01D 25/18* (2013.01); *F02C 7/06* (2013.01); *F02C 7/36* (2013.01); *F02K 3/04* (2013.01);
(Continued)

(58) Field of Classification Search
None
See application file for complete search history.

(56) References Cited

U.S. PATENT DOCUMENTS

| | | | |
|---|---|---|---|
| 4,251,987 A * | 2/1981 | Adamson ................ | F02C 3/113 417/405 |
| 8,813,469 B2 * | 8/2014 | Sheridan ................ | F01D 25/16 184/6.12 |

(Continued)

FOREIGN PATENT DOCUMENTS

| | | |
|---|---|---|
| WO | 2010/092263 A1 | 8/2010 |
| WO | 2015/019025 A1 | 2/2015 |

OTHER PUBLICATIONS

International Search Report dated Jan. 16, 2017, issued in corresponding International Application No. PCT/FR2016/052238, filed Sep. 8, 2016, 2 pages.
(Continued)

*Primary Examiner* — Colby M Hansen
(74) *Attorney, Agent, or Firm* — Christensen O'Connor Johnson Kindness PLLC

(57) ABSTRACT

A bowl for supplying oil to at least two oil-distribution circuits which are connected to a planet carrier of an epicyclic reduction gearbox, the planet carrier rotating and the oil coming from a fixed oil ejector, the bowl being designed to be secured to the planet carrier and having a substantially cylindrical shape and being open radially towards the inside with respect to an axis. The bowl is divided into a circumferential succession of separate cups each designed to communicate with one of the oil distribution circuits A reduction gearbox with its supply device and a method of operation in a turbomachine are also disclosed.

9 Claims, 3 Drawing Sheets

(51) Int. Cl.
*F02C 7/36* (2006.01)
*F02C 7/06* (2006.01)
*F16H 57/04* (2010.01)
*F16N 7/36* (2006.01)

(52) U.S. Cl.
CPC ..... *F16H 57/0427* (2013.01); *F16H 57/0479* (2013.01); *F16H 57/0482* (2013.01); *F16N 7/363* (2013.01); *F05D 2260/40311* (2013.01); *Y02T 50/671* (2013.01)

(56) References Cited

U.S. PATENT DOCUMENTS

| | | | |
|---|---|---|---|
| 2008/0116010 A1* | 5/2008 | Portlock | F01D 25/18 184/6.12 |
| 2011/0299974 A1 | 12/2011 | Gauthier et al. | |
| 2012/0192570 A1* | 8/2012 | McCune | F01D 25/18 60/792 |
| 2012/0275904 A1* | 11/2012 | McCune | F01D 5/027 415/122.1 |
| 2013/0225353 A1 | 8/2013 | Gallet et al. | |
| 2016/0201791 A1 | 7/2016 | Curlier et al. | |

OTHER PUBLICATIONS

Written Opinion of the International Searching Authority dated Jan. 16, 2017, issued in corresponding Internationa Application No. PCT/FR2016/052238, filed Sep. 8, 2016, 5 pages.
International Preliminary Report on Patentabilily dated Mar. 20, 2018, issued in corresponding International Application No. PCT/FR2016/052238, filed Sep. 8, 2016, 1 page.

\* cited by examiner

OIL SUPPLY DEVICE FOR AN EPICYCLIC REDUCTION GEAR SET

TECHNICAL FIELD

The field of the present invention is that of turbine engines and more particularly that of differential transmission systems in these turbine engines, notably epicyclic reduction gear trains.

PRIOR ART

Existing turbine engines, notably turbine engines comprising one or more fans blowing a secondary airflow, comprise a transmission system, called a reduction gear, for driving this or these fan(s) at the proper rotary speed from the shaft of the power turbine of the primary body of the engine.

The operation of reduction gear trains, in particular on turbine engines with a blower fan with a high by-pass ratio, requires a particularly high oil flow rate, of the order of 6000 to 7000 liters per hour at take-off, to provide lubrication and cooling of the gears and bearings.

The reduction gears used include epicyclic reduction gear trains, which have the advantage of offering high reduction ratios of the rotary speed with reduced overall dimensions. However, they have the drawback that they have planet pinions that revolve around the rotation axis of the drive shaft of the reduction gear. They therefore require devices for transferring the oil received from a reservoir and a pump located at a fixed point, to lubricating means that follow the rotary movement of the planet pinions around the drive shaft. To solve this problem, the devices commonly used comprise systems of rotating seals.

These systems have the drawbacks of being bulky, and their wear is incompatible with the service life required for aeronautical engines, which affects the maintenance of said engines. Finally, these reduction gear systems are not readily compatible with flexible installation of the structure of the turbine engine, recommended for example for overcoming a problem of loss or breakage of a blade of the blower fan, or else with installation of the modular type, to facilitate engine assembly.

With the aim of rectifying these drawbacks, the applicant has already proposed, in applications WO-A1-2010/092263 and FR-A1-2987416, lubrication devices without rotating seals, where an injector squirts the oil derived from the circuit from the fixed point to a bowl integral with a planet pinion carrier, which revolves around the injector and confines the oil recovered by centrifugation before directing it to the gear lubricating means.

These devices thus greatly improve the reliability of the lubrication system of the reduction gear as well as its maintenance. Moreover, the technical solution described in application WO-A1-2010/092263 makes it possible to adjust the oil flow going to different gears as a function of their lubrication needs. For this, the receiving bowl is segmented into sections along the rotation axis and separate nozzles on the injector supplying these sections. The oil recovered by each axial section is then directed to a circuit dedicated for one type of gearing.

However, this solution does not allow modulation of the distribution of the oil flow between the sections as a function of the operating conditions of the turbine engine. Moreover, it is relatively complex, with dedicated nozzles for each axial section on the injector. Furthermore, multiplication of the number of nozzles may pose questions of reliability.

The aim of the invention is to overcome these drawbacks, while maintaining or even improving the advantages of the technical solutions proposed in the aforementioned applications.

DESCRIPTION OF THE INVENTION

For this purpose, the invention relates to a bowl intended to supply oil to at least two oil distribution circuits connected to a planet carrier of an epicyclic reduction gear train, said planet carrier being in rotation, with the oil coming from a fixed means of oil ejection, said bowl being configured to be integral with said planet carrier and having an approximately cylindrical shape, being open radially inwards relative to an axis, characterized in that it is divided into a circumferential succession of separate cups, each arranged to communicate with one of said oil distribution circuits.

In other words, circumferential separations are placed between the successive cups on the circumference of the bowl. By separating the bowl into a circumferential succession of cups associated with the various oil distribution circuits, it is possible to distribute the flow rates among these circuits by acting on the circumferential extension of the cups. This offers an economical alternative to the previous solutions as the bowl can be adjusted to a single injector, which does not need to be designed for distributing the flow rates. This also increases the reliability of the system by simplifying the injector. Moreover, advantages of reliability are obtained by separating the cups among the oil distribution circuits, so that any malfunction of one does not affect the others.

Preferably, the cups communicate with said oil distribution circuits via a bottom delimiting them radially outwards.

Advantageously, said circumferential succession of cups comprises at least two circumferentially alternating series of cups, defined by circumferential extensions of the different cups between each series.

This design ensures good rotation of the lubricant by means of the separating walls of these cups and therefore the creation of a centrifugal pressure supplying the oil distribution circuits.

This design distributes the lubricant received by the bowl among the various oil distribution circuits. It makes it possible in particular to optimize the oil flow rate as a function of the requirements, at least for one operating condition, and therefore minimize the weight of oil present in the turbine engine.

Preferably, said cups are separated circumferentially by circumferential separations and delimited axially on either side by transverse walls of said bowl, each of the transverse walls having an approximately circular transverse internal peripheral edge and the circumferential separation between two successive cups comprising an internal radial edge further from the axis than said transverse internal peripheral edges, so as to promote circumferential overflowing of the oil retained by centrifugation in a cup.

On the one hand, this increases the reliability and minimizes the consumption of oil to be provided for the case of malfunction of the oil circuits, because in the case of accidental overflow from a cup, the oil is first recovered by the other cups. On the other hand, this makes it possible, by adjusting the radius of edges of the circumferential separation walls, and therefore their height relative to the bottom, to define a second distribution of the oil flow rate among the circuits, by overflow from one cup to another, for a second operating mode relative to the operating mode mentioned above.

Preferably, the bowl has a U-section internal shape in a radial plane.

The invention also relates to an oil supply device for an epicyclic reduction gear train comprising a bowl as described above, further comprising oil distribution circuits connected to said planet pinion carrier of the reduction gear and communicating with said cups, at least one fixed oil feed channel and a means for oil ejection at the end of said at least one feed channel, configured for ejecting the oil in said bowl.

Notably, such a device adapts to a modular design of the reduction gear and/or of the turbine engine, as the rotor and/or the planet pinion carrier may be assembled on the oil feed channels by translation along the axis.

The invention also relates to a reduction gear comprising such a device and a turbine engine comprising it.

The invention also relates to a method of oil supply of said reduction gear in a turbine engine, comprising regulating the oil flow sent to the bowl by the oil ejection means, so that the oil recovered from a cup supplies the oil distribution circuit with which the latter communicates and forms, in said cup, a pocket of oil held between walls of the latter, for at least one first operating mode of the turbine engine.

Preferably, the method comprises distributing the lubricant between two oil distribution circuits as a function of their oil flow needs, for at least one first operating mode of the turbine engine, by a differentiated circumferential extension of the cups communicating with said two oil distribution circuits. Advantageously, with the radially inner edges of the walls of one cup defining an inlet surface in the radial direction, the ratio of the inlet surfaces of the two cups is proportional to the ratio between the needs for lubricant flow of the two oil distribution circuits with which they communicate.

Advantageously, the method comprises regulating the oil flow sent to the bowl by the oil ejection means, so that the oil recovered from a cup supplies the oil distribution circuit with which the latter communicates and forms, for at least one cup, a pocket of oil that pours out circumferentially to another cup, for at least one second operating mode of the turbine engine

BRIEF DESCRIPTION OF THE DRAWINGS

The present invention will be better understood and other details, features and advantages of the present invention will become clearer on reading the description given hereunder, referring to the appended drawings, in which.

DESCRIPTION OF ONE EMBODIMENT OF THE INVENTION

Figure 1:
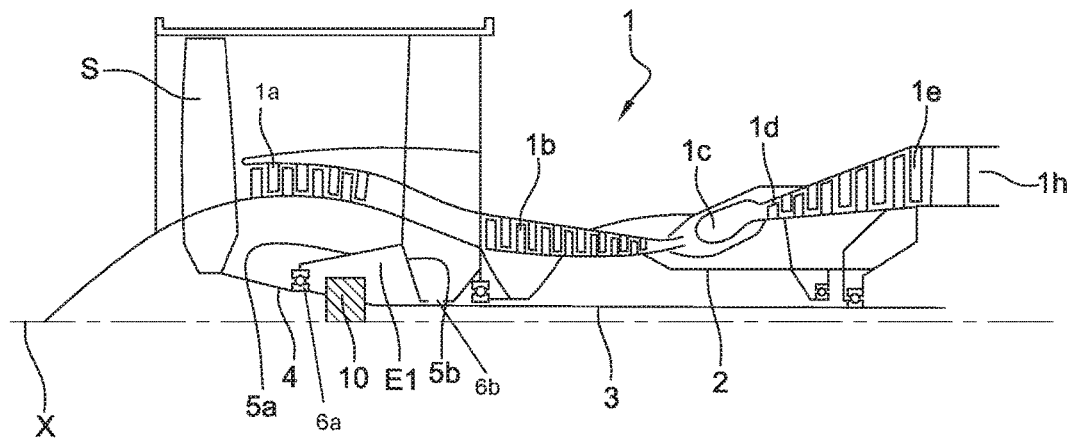
FIG. 1 is a schematic representation of an axial section of a turbine engine using the invention.

Referring to FIG. 1, the invention relates, for example, to a turbine engine 1 that comprises, conventionally, a blower fan S, a low-pressure compressor 1a, a high-pressure compressor 1b, a high-pressure turbine 1d, a low-pressure turbine 1e and a jet nozzle 1h. The high-pressure compressor 1b and the high-pressure turbine 1d are connected by a high-pressure shaft 2 and together they form a high-pressure body (HP). The low-pressure compressor 1a and the low-pressure turbine 1e are connected by a low-pressure shaft 3 and together they form a low-pressure body (LP).

In one configuration of the invention, the blower fan S is driven by a fan shaft 4 that is coupled to the LP shaft 3 by means of an epicyclic reduction gear train 10, shown schematically here.

The reduction gear 10 is positioned in the front section of the turbine engine. A fixed structure, comprising schematically, here, an upstream part 5a and a downstream part 5b, is arranged so as to form an enclosure E1 around the reduction gear 10. Here, this enclosure E1 is closed upstream by seals at the level of a bearing 6a allowing passage of the fan shaft 4, and downstream by seals at the level of the passage 6b of the LP shaft 3.

Figure 2:
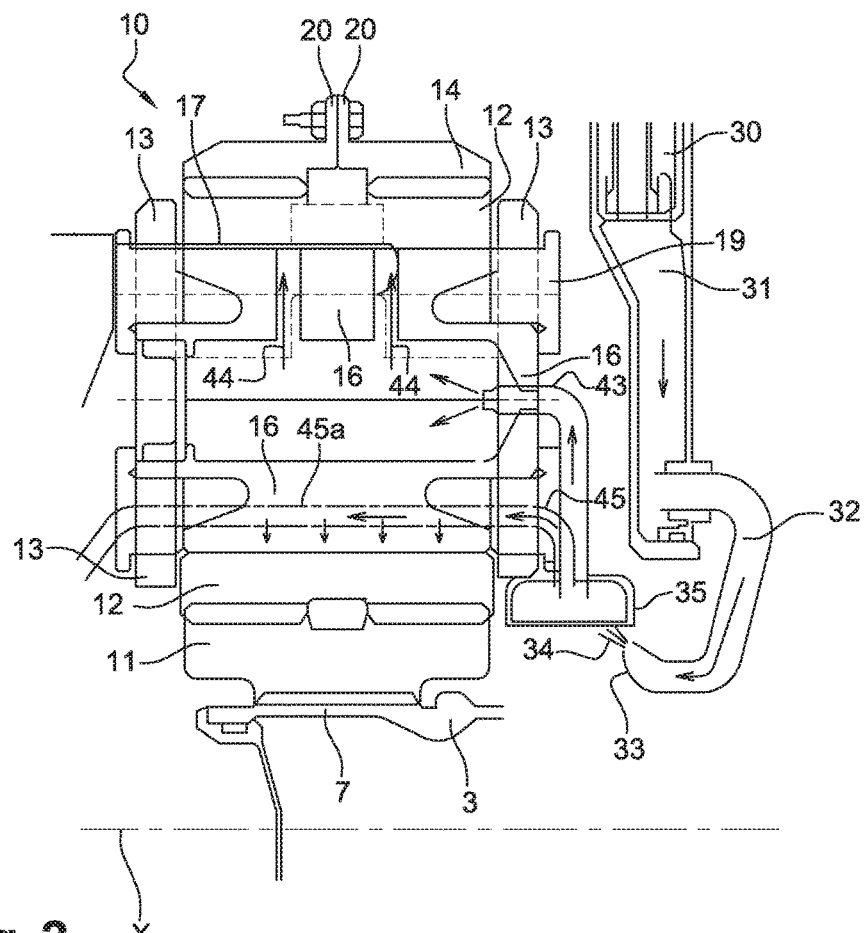
FIG. 2 shows a detailed sectional view of an epicyclic reduction gear train, equipped with a rotor according to the invention.
Figure 3:
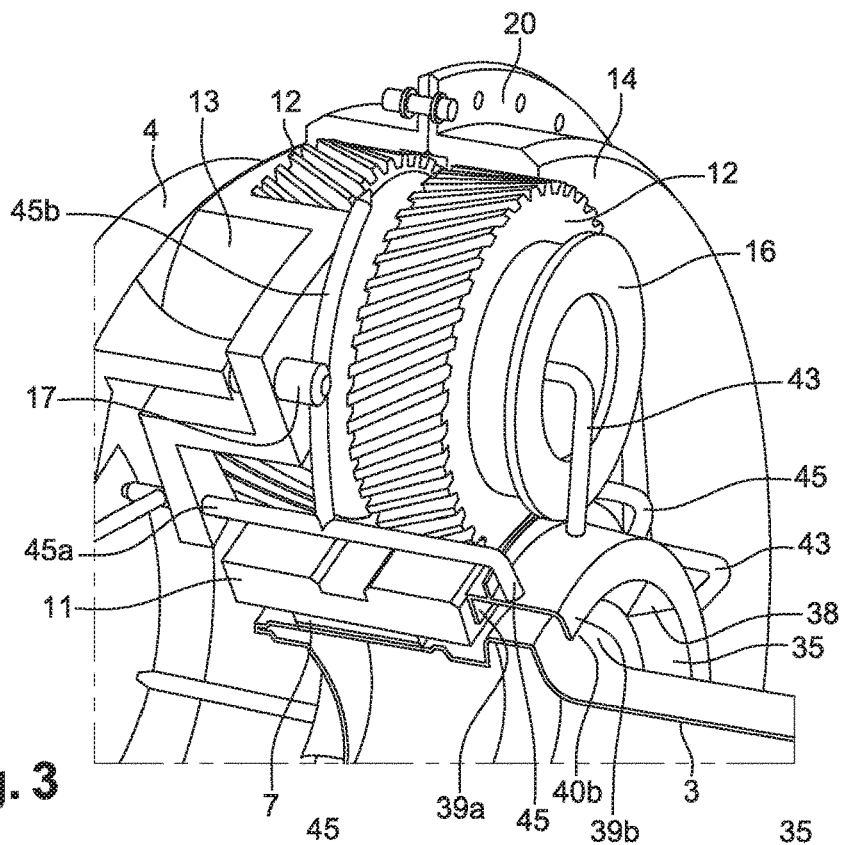
FIG. 3 is an exploded perspective view of the reduction gear in FIG. 2.

Referring to FIGS. 2 and 3, the reduction gear is enclosed in a crown 14 that is fixed via a supporting casing 20 to said fixed structure 5a, 5b with flexible means configured to allow it to follow any movements of the fan shaft 4, in certain degraded operating cases, for example. These fixing means are known by a person skilled in the art and are not detailed here. A brief description of them may be found for example in FR-A1-2987416.

The reduction gear 10 of the example being considered engages on the one hand on the LP shaft 3 by means of splines 7 that drive a sun pinion 11, and on the other hand on the fan shaft 4 that is connected to a planet pinion carrier 13. Conventionally, the sun pinion 11, whose rotation axis X coincides with that of the turbine engine, drives a series of planet pinions 12, which are distributed regularly on the circumference of the reduction gear 10. The number of planet pinions 12 is generally defined between three and six. The planet pinions 12 also revolve around the axis X of the turbine engine, meshing with the internal teeth of the crown 14, which is mounted fixed with respect to the turbine engine, by means of the supporting casing 20. Each of the planet pinions 12 rotates freely around a planet pinion shaft 16 connected to the planet pinion carrier 13, using a bearing, which may be smooth, as shown in FIG. 2, or a rolling bearing (ball bearing or roller bearing).

The rotation of the planet pinions 12 around their planet pinion shaft 16, through interaction of their pinions with the teeth of the crown 14, leads to rotation of the planet pinion carrier 13 around the axis X, and consequently that of the fan shaft 4 connected thereto, at a rotary speed that is lower than that of the LP shaft 3.

Drive of the fan shaft 4 by the planet pinion carrier 13 is provided by a series of centring pins 17, distributed regularly on the circumference of the reduction gear 10, which extend axially from the downstream end of the fan shaft 4 and enter holes drilled in the planet pinion carrier 13. The planet pinion carrier 13 extends symmetrically on either side of the planet pinion shafts 16 and forms an enclosure in which a gear lubrication function can be performed. Closing bushes 19, at the ends of the planet pinion shafts 16, make it possible to close this enclosure at the level of the bearings of the planet pinions 12.

FIG. 2 shows, with FIG. 3, conveying of the oil to the reduction gear 10 and its path inside the latter. Arrows in FIG. 2 show the path followed by the oil from, in this example, a buffer reservoir 31 connected to the fixed structure of the turbine engine, to the pinions and bearings to be lubricated. Schematically, the lubricating device comprises three parts, which will be described hereunder in turn, a first part connected to the fixed structure and delivering oil to the rotating parts of the reduction gear 10, a rotor that rotates with the planet pinion carrier 13 receiving this oil, and oil distribution circuits supplied with oil by the rotor for conveying it to the places to be lubricated.

The first part comprises at least one injector 32, the calibrated end of which is narrowed to form a nozzle 33. The oil is conveyed to the injector by a feed channel 30, coming from the reservoir of the engine (not shown). A buffer reservoir 31 may be interposed alongside the reduction gear 10 on the channel, preferably high up so that the oil can flow to the centre of the reduction gear by gravity. The nozzle 33 ejects the oil in the form of a jet 34, which forms under the pressure produced jointly by the feed pump (not shown) and by the weight of the column of oil above it. Here, the nozzle 33 is positioned radially inside the planet pinion carrier 13 relative to the axis X and the jet 34 is oriented with a radial component directed towards the exterior of the reduction gear 10.

Figure 4:
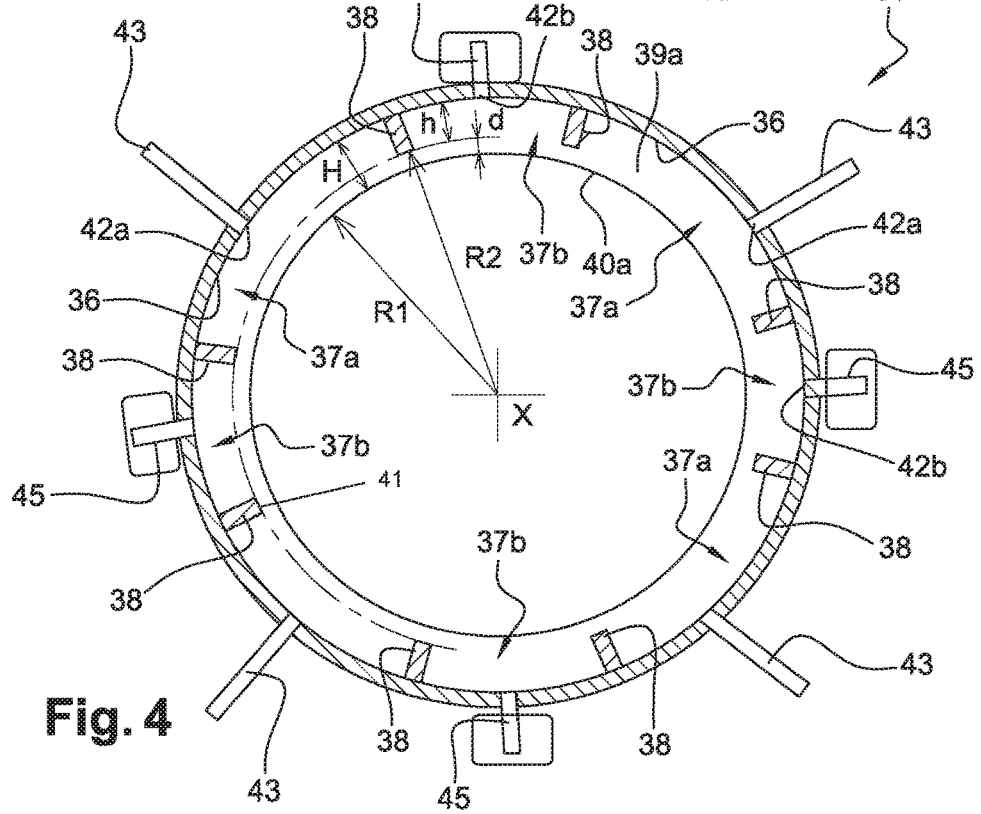
FIG. 4 shows a schematic section of a rotor according to the invention.

Referring to FIGS. 3 and 4, the oil receiving rotor connected to the planet pinion carrier 13 essentially comprises a cylindrical bowl, here with a U-shaped radial section, with the opening of the U oriented in the direction of the rotation axis X. The rotor is arranged on the planet pinion carrier 13 so that the bottom 36 of the U of the bowl 35 collects the oil jet 34 ejected by the nozzle 33.

According to the invention, the bowl 35 of the rotor is divided here into a circumferential succession of cups 37*a*, 37*b* separated by walls 38 oriented radially and extending axially between the two side walls 39*a*, 39*b* of the U formed by the bowl 35. In the example shown, the circumferential separating walls 38 delimit two alternating series of four cups 37*a*, 37*b*, with a circumferential extension identical in one series but different from one series to another.

By centrifugation, when the rotor turns with the planet pinion carrier 13, the oil received at the bottom 36 of the bowl 35 is rotated and pressurized between the bottom 36 and the side walls 39*a*, 39*b* of the bowl 35. Each cup 35*a*, 35*b*, passing successively in front of the nozzle 33 during rotation, collects an amount of oil proportional to its circumferential extension. In fact, the radially inner edges of the walls 39*a*-39*b*-38 of a cup 37*a*, 37*b* define an inlet area of the cup in the radial direction. This oil remains confined between the walls 38, 39*a*, 39*b* of the cup 37*a*, 37*b* while the level of oil relative to the bottom 36 remains below the minimum height h of the walls 38 of the latter relative to the bottom 36.

The inner radial edges 40*a*, 40*b* of the side walls 39*a*, 39*b* are approximately circular. Their radius R1 defines a general depth H of the bowl 35 relative to the bottom 36. Preferably, the circumferential separating walls 38 have an inner radial edge 41 located at a distance R2 from the axis X slightly greater than the radius R1 of the inner edges 40*a*, 40*b* of the side walls 39*a*, 39*b*. The height h of the circumferential separating walls 38 relative to the bottom 36 of the cups 37*a*, 37*b* is therefore slightly less than the height H of the side walls 39*a*, 39*b* relative to this same bottom 36. For the invention, this height difference d may be small, it is sufficient that it allows the oil to flow preferentially above the circumferential separating walls 38 instead of going past the inner edges 40*a*, 40*b* of the side walls 39*a*, 39*b*, if the oil level rises in a cup 37*a*, 37*b*. Typically, for a turbine engine reduction gear 10 of the type presented here, a height difference d of the order of 3 millimeters might be sufficient.

Moreover, the bottom 36 of each cup 37*a*, 37*b* comprises an opening 42*a*, 42*b* that communicates with a channel 43, 45 of an oil distribution circuit installed on the planet pinion carrier 13.

Referring to FIGS. 2 and 3, in this case the oil distribution circuits are of two types. A first series of oil distribution circuits corresponds to first channels 43, which are distributed regularly on the circumference of the reduction gear 10 and are equal in number to the planet pinions 12. These channels 43 leave radially from the opening 42*a* of the bottom of the first series of cups 37*a* and enter into the internal enclosure of each planet pinion shaft 16, which is enclosed by the planet pinion carrier 13. The oil that circulates in the first channels 43 enters into the internal cavity of each pinion shaft 16 and then passes, by centrifugal force, into guide channels 44, which go past these planet pinion shafts 16, being oriented radially. These channels 44 open out at the periphery of the planet pinion shafts 16, at the level of the bearings supporting the planet pinions 12 and thus provide lubrication of these bearings.

The second series of oil distribution circuits comprises second channels 45 that follow a path from the openings 42*b* at the bottom of the cups 37*b* of the second series of cups between the planet pinions 12, and split into several channels 45*a*, 45*b*. The channels 45*a*, 45*b* convey oil to the gear trains formed by the planet pinions 12 and the sun pinion 11, on the one hand, and the planet pinions 12 and the external crown 14, on the other hand. Each channel 45*a* extends axially along the planet pinions 12, between the latter and the sun pinion 11, and forms a lubrication ramp over the entire width of the pinions. The channel 45*b*, which supplies the gear train between the crown 14 and the planet pinions 12, projects its oil to the centre of the cylinder formed by each planet pinion 12. As shown, each planet pinion 12 is made in the form of two parallel pinions. Their teeth are oriented diagonally relative to the rotation axis of the planet pinion 12, so as to give them a function of grooves, in which the oil is led from the middle of the cylinder to its periphery, to lubricate the gear train over its entire width.

In this example, the first oil distribution circuits 43-44, which lubricate the bearings supporting the planet pinions, need to convey a greater oil flow than the second circuits 45-45*a*-45*b*. For this reason, the circumferential extension of the cups 37*a* of the first series, which correspond to them, is greater than that of the cups 37*b* of the second series. Here, a ratio of two thirds to one third is required in the oil flow rate in nominal operation; the circumferential extension of the two series of cups 37*a*, 37*b* adheres approximately to this ratio.

The assembly has been presented here with reference to an architecture of reduction gear 10 having four planet pinions 12 with two series of oil distribution circuits 43-44, 45-45*a*-45*b* of different types. The number of cups per series may be different for other architectures of reduction gears. Similarly the number of series of cups having similar circumferential extensions may be different, depending on the types of oil distribution circuits. For example, the second oil distribution circuits could be subdivided into two, one dedicated to the gear train of the planet pinions 12 with the sun pinion 11 and the other dedicated to the gear train with the crown 14. In this case, a variant embodiment of the oil recovery rotor is conceivable with three series of cups with different circumferential extensions.

We shall now describe several embodiments of the lubricating device, in relation to the arrangement of the cups 37*a*, 37*b* in the bowl 35.

Figure 5A:
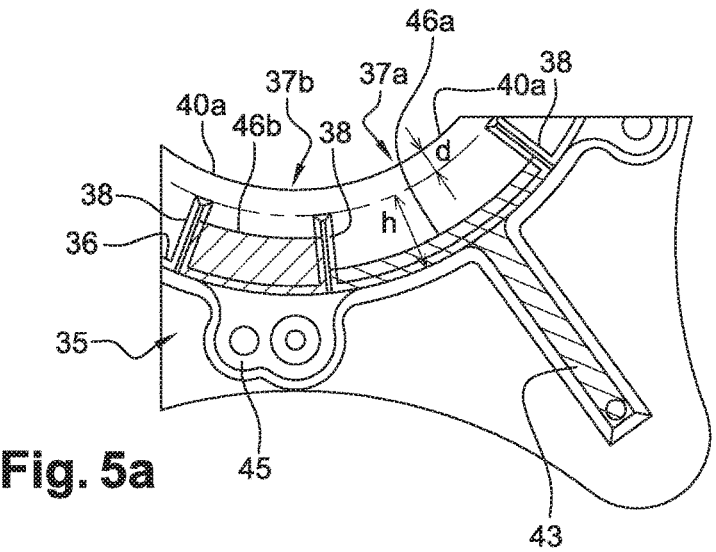
FIGS. 5a, 5b, 5c show an enlargement of part of FIG. 4, indicating different operating modes of the invention.

Referring to FIG. 5a, in a first operating mode corresponding to nominal operating conditions of the turbine engine, for example cruising flight for the aircraft on which it is installed, a first oil flow is sent by the nozzle 33 to the bowl 35. This flow is adjusted so as to correspond to the sum of the flows used by all of the oil distribution circuits, represented in FIGS. 5a-5c by the channels 43, 45 leaving the bowl 35.

Here, as described above, the first oil distribution circuits 43 require a higher oil flow rate than the second circuits 45 in a ratio of two thirds to one third. The bowl 35 of the rotor has therefore been designed so that the extension of the cups 37a of the first series is greater than that of the cups 37b of the second series, approximately in the same ratio. During operation of the reduction gear 10, each cup 37a, 37b forms a buffer reservoir for the oil entering the oil distribution circuit with which it communicates. Under the effect of the centrifugation pressure and as a function of the law relating the flow rate to the pressure of each of the oil distribution circuits 43, 45, the oil forms, in each cup 37a, 37b, a pocket whose level reaches an equilibrium at a certain value relative to the bottom 38. In FIG. 5a, and in the next figures, the level of the oil pocket present in a cup 37a, 37b is represented by a circular arc 46a, 46b, separated from the bottom 36 by a hatched zone representing the oil.

The oil level 46a, 46b is not the same in the series of cups 37a, 37b. Here the oil level 46b in cups 37b of the second series is higher than the oil level 46a in cups 37a of the first series for an identical volume of stored oil buffer, because of their smaller circumferential extension. In the design of the rotor, the circumferential separating walls 38 of the cups 37a, 37b were made with a height h higher than these oil levels 46a, 46b. Accordingly, each cup 37a, 37b fulfils its function of supplying oil to the corresponding oil distribution circuit 43, 45, independently of the other cups. The oil flow sent by the nozzle 33 is therefore distributed between the oil distribution circuits 43, 45 in the ratio determined as a function of their needs for this first operating mode.

Figure 5B:
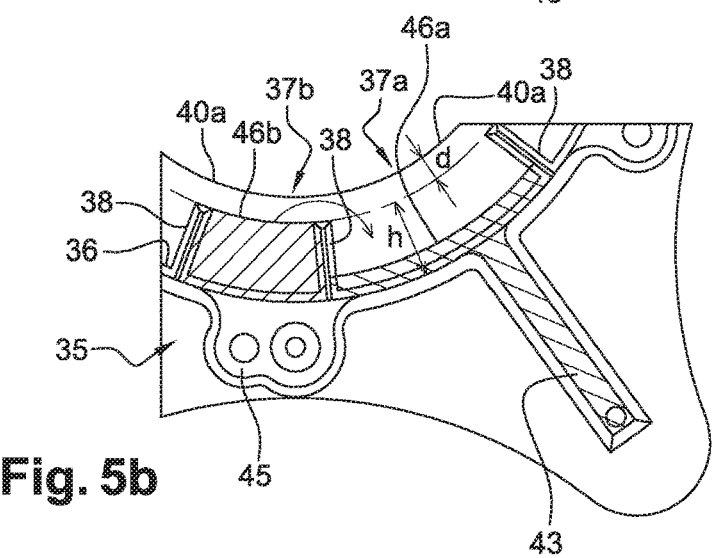

Referring to FIG. 5b, in a second operating mode corresponding to a second set of operating conditions of the turbine engine, for example for aircraft take-off, the needs for lubricant of the reduction gear 10 increase and, in addition, they may be distributed differently between the oil distribution circuits 43, 45. For this, a second oil flow rate, higher than the first, is sent by the nozzle 33 to the bowl 35, so as to correspond to all of the needs of the oil distribution circuits 43, 45.

In this case, the oil level 46a, 46b in the cups 37a, 37b rises, notably the oil level 46b of cups 37b of the second series, which already had a higher value than the oil level 46a in cups 37a of the first series. The nominal value that it should reach is in this case a function of the law relating the flow rate to the pressure in each oil distribution circuit 43, 45. Moreover, in designing the rotor, the circumferential separating walls 38 between the cups 37a, 37b were made with a height h less than said nominal value. In addition, as stated above, the circumferential separating walls 38 have a height h relative to the bottom 36 slightly less than the height H of the side walls 39a, 39b. As a result, in this second operating mode, the cups 37b of the second series overflow to the cups 37a of the first series but the oil remains confined in the bowl 35 by the side walls 39a, 39b. One consequence of this phenomenon is that the cups 37a of the first series are supplied with oil both directly by the injector 33 and by the overflowing of the cups 37b of the second series. The ratio of the oil flow rate supplying the first oil distribution circuits 43 to that supplying the second oil distribution circuits 45 therefore increases. Typically, a ratio of three quarters to one quarter is obtained in the example considered.

Figure 5C:
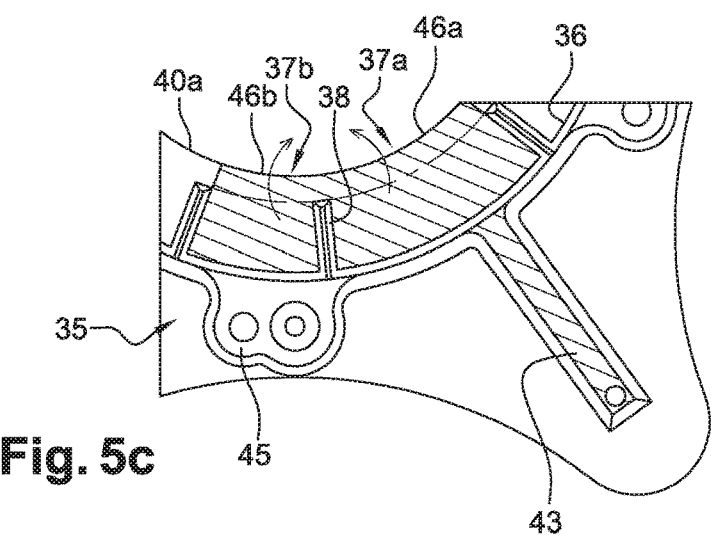

Referring to FIG. 5c, if, for some accidental reason, the flow sent by the injector 33 becomes too great relative to the one passing through the oil distribution circuits 43, 45 of the reduction gear 10, the oil level 46a, 46b in the cups 37a, 37b reaches the inner radial edges 40a, 40b of the side walls 39a, 39b. The oil then begins to overflow from the bowl 35 via the side walls 39a, 39b, as in the prior art. The excess oil escaping from the bowl 35 is then recovered in the enclosure E1 around the reduction gear 10.

Furthermore, the situation presented in FIG. 5b may also correspond to a degraded case when, here, one of the second oil distribution circuits 45 is blocked and does not absorb the nominal oil flow. In this case, the corresponding cup 37b overflows into the adjacent cups 37a without any oil escaping via the side walls 39a, 39b.

Conversely, in one case, not shown, in which one of the oil distribution circuits is not set correctly and allows more oil to pass than required, the level of oil in the corresponding cup may go down, but this does not affect the operation of the other cups and the lubrication provided by the other circuits.

The invention has been presented for one type of turbine engine and for one type of reduction gear but a person skilled in the art can easily transfer it, notably to the case of epicyclic reduction gear trains driving two counter-rotating fans, in which the outer crown rotates.

The invention claimed is:

1. A bowl for supplying oil to at least two oil distribution circuits connected to a planet pinion carrier of an epicyclic reduction gear train, said planet pinion carrier rotating and the oil coming from a fixed means for oil ejection, said bowl being configured to be integral with said planet pinion carrier and having an approximately cylindrical shape, being open radially inwards relative to an axis, wherein it is divided into a circumferential succession of separate cups each arranged to communicate with one of said oil distribution circuits.

2. The bowl according to claim 1, in which said circumferential succession of cups comprises at least two series of cups alternating circumferentially, defined by circumferential extensions of the different cups between each series.

3. The bowl according to claim 1, in which said cups are separated circumferentially by circumferential separations and delimited axially on either side by transverse walls of said bowl, each of the transverse walls having an approximately circular transverse internal peripheral edge and the circumferential separation between two successive cups comprising an inner radial edge farther from the axis than said transverse internal peripheral edges, so as to promote circumferential overflowing of the oil retained by centrifugation in a cup.

4. The bowl according to claim 1, having a U-section internal shape in a radial plane.

5. An oil supply device for an epicyclic reduction gear train comprising a bowl according to claim 1, further comprising oil distribution circuits connected to said planet pinion carrier of the reduction gear and communicating with said cups, at least one fixed channel for oil feed and a means for oil ejection at the end of said at least one feed channel, configured for ejecting the oil in said bowl.

6. A reduction gear comprising a device according to claim 1.

7. A method for supplying oil to a reduction gear according to claim 6 in a turbine engine, the method comprising:

regulating the oil flow rate sent to the bowl by the oil ejection means, so that the oil recovered from one of the cups supplies an oil distribution circuit with which the latter communicates, and forms, in said cup, a pocket of oil maintained between walls of the latter, for at least one first operating mode of the turbine engine.

8. The method according to claim 7, further comprising distributing the lubricant between two oil distribution circuits as a function of their oil flow needs, for at least one first operating mode of the turbine engine, by a differentiated circumferential extension of the cups communicating with said two oil distribution circuits.

9. The method according to claim 7, further comprising regulating the oil flow sent to the bowl by the oil ejection means, so that the oil recovered from a cup supplies the oil distribution circuit with which the latter communicates, and forms, for at least one cup, a pocket of oil that pours out circumferentially to another cup, for at least one second operating mode of the turbine engine.

* * * * *